United States Patent
Huang et al.

(10) Patent No.: US 9,537,646 B2
(45) Date of Patent: Jan. 3, 2017

(54) RETRY DISPARITY FOR CONTROL CHANNEL OF A MULTIMEDIA COMMUNICATION LINK

(71) Applicant: Lattice Semiconductor Corporation, Portland, OR (US)

(72) Inventors: Jiong Huang, Sunnyvale, CA (US); Lei Ming, San Jose, CA (US); Gyudong Kim, Sunnyvale, CA (US); Young Il Kim, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/470,809

(22) Filed: Aug. 27, 2014

(65) Prior Publication Data

US 2016/0065354 A1    Mar. 3, 2016

(51) Int. Cl.
  *H04L 5/14*    (2006.01)
  *H04L 5/16*    (2006.01)

(52) U.S. Cl.
  CPC .......... *H04L 5/1415* (2013.01); *H04L 5/1407* (2013.01); *H04L 5/1469* (2013.01); *H04L 5/16* (2013.01)

(58) Field of Classification Search
  None
  See application file for complete search history.

(56) References Cited

U.S. PATENT DOCUMENTS

| | | | |
|---|---|---|---|
| 5,255,308 A * | 10/1993 | Hashimoto | H04W 84/16 455/463 |
| 5,440,545 A | 8/1995 | Buchholz et al. | |
| 5,699,357 A * | 12/1997 | Carvey | H04W 84/18 370/347 |
| 6,108,713 A * | 8/2000 | Sambamurthy | H04L 29/06 370/463 |
| 6,469,996 B1 | 10/2002 | Dupuy | |
| 7,103,371 B1 | 9/2006 | Liu | |
| 2003/0095562 A1 | 5/2003 | Liu et al. | |
| 2004/0160957 A1* | 8/2004 | Coffman | H04L 1/1809 370/394 |
| 2005/0144310 A1* | 6/2005 | Biran | H04L 47/193 709/234 |
| 2007/0195728 A1 | 8/2007 | Chen et al. | |
| 2008/0285562 A1* | 11/2008 | Scott | G06F 15/17362 370/392 |
| 2009/0171962 A1* | 7/2009 | Goodman | G06F 9/467 |
| 2013/0223293 A1 | 8/2013 | Jones et al. | |
| 2015/0128142 A1* | 5/2015 | Fahim | G06F 9/52 718/102 |

* cited by examiner

*Primary Examiner* — Ayaz Sheikh
*Assistant Examiner* — Tarell Hampton
(74) *Attorney, Agent, or Firm* — Fenwick & West LLP

(57) ABSTRACT

A multimedia system for data communications. A source device communicates data over a full duplex control channel of a multimedia communication link. The source device has a first link layer that retries unsuccessful data communications over the full duplex control channel until a first maximum retry limit of the first link layer is reached. A sink device communicates data over the full duplex control channel of the multimedia communication link. The sink device has a second link layer that retries unsuccessful data communications over the full duplex control channel until a second maximum retry limit of the second link layer is reached, where the second maximum retry limit is different than the first maximum retry limit.

20 Claims, 7 Drawing Sheets

RETRY DISPARITY FOR CONTROL CHANNEL OF A MULTIMEDIA COMMUNICATION LINK

BACKGROUND

1. Field of the Disclosure

This disclosure pertains in general to a multimedia system, and more specifically to controlling communications over a control channel of a multimedia communication link.

2. Description of the Related Art

Devices that communicate over a control channel of a multimedia communication link (e.g., Mobile High Definition Link (MHL)) have traditionally been half duplex at both the translation layer and link layer. Changing the link layer to full duplex can increase the bandwidth across the control channel. However, a full duplex link layer may not be backwards compatible with existing half duplex translation layers unless complex conflict resolution logic is added to the full duplex link layer.

SUMMARY

Embodiments of the present disclosure are related to systems and devices for communication over a control channel of a multimedia communication links. In one embodiment, a system for data communications is disclosed. The system comprises a multimedia communication link having a full duplex control channel. A source device communicates over the full duplex control channel of the multimedia communication link using time domain multiplexed (TDM) frames having n time slots per frame. The source device allocates a first time slot position to a virtual channel for data transmission by the source device over the full duplex control channel. A sink device communicates over the full duplex control channel of the multimedia communication link. The sink device allocates a second time slot position to the virtual channel for data transmission by the sink device over the full duplex control channel. A timing of the second time slot position is offset from a timing of the first time slot position by substantially n/2 time slots.

In another embodiment, a first device for data communications with a second device via a multimedia communication link is disclosed. The first device includes an interface for coupling to a full duplex control channel of the multimedia communications link. The first device also includes a link layer to communicate over the full duplex control channel using time domain multiplexed (TDM) frames having n time slots per frame. The link layer allocates a first time slot position to a virtual channel for data transmission by the first device over the full duplex control channel. A second time slot position is allocated to the virtual channel for data transmission from the second device over the full duplex control channel. A timing of the second time slot position is offset from a timing of the first time slot position by substantially n/2 time slots.

In a further embodiment, a system for data communications includes a multimedia communication link having a full duplex control channel. A source device communicates data over the full duplex control channel of the multimedia communication link. The source device has a first link layer that retries unsuccessful data communications over the full duplex control channel until a first maximum retry limit of the first link layer is reached. A sink device communicates data over the full duplex control channel of the multimedia communication link. The sink device has a second link layer that retries unsuccessful data communications over the full duplex control channel until a second maximum retry limit of the second link layer is reached, where the second maximum retry limit is different than the first maximum retry limit.

In yet another embodiment, a first device for data communications with a second device via a multimedia communication link is disclosed. The first device comprises an interface to a full duplex control channel of the multimedia communication link. A link layer communicates data with the second device over the full duplex control channel. The link layer retries unsuccessful data communications over the full duplex control channel until a first maximum retry limit is reached. The first maximum retry limit is different than a second maximum retry limit of a link layer of the second device.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiment of the present disclosure relate to systems for communication over a full duplex control channel of a multimedia communication link while retaining a half duplex translation layer. For example, the multimedia communication link may be MHL that has a full duplex enhanced control bus (eCBUS). A source device and sink device set the timing of TDM time slot positions for a virtual channel such the TDM time slot position in one direction (e.g. from source to sink) is offset from the TDM time slot position in the other direction (e.g. from sink to source) by substantially half a TDM frame. Offsetting TDM time slots in different directions reduces the need for complex conflict handling logic at the link layers of the source device and sink device. Additionally, the source device and sink device may have asymmetric maximum retry limits at the link layers, which prevents communication deadlocks.

Offset Phase Relationship of Time Slots

Figure 1:
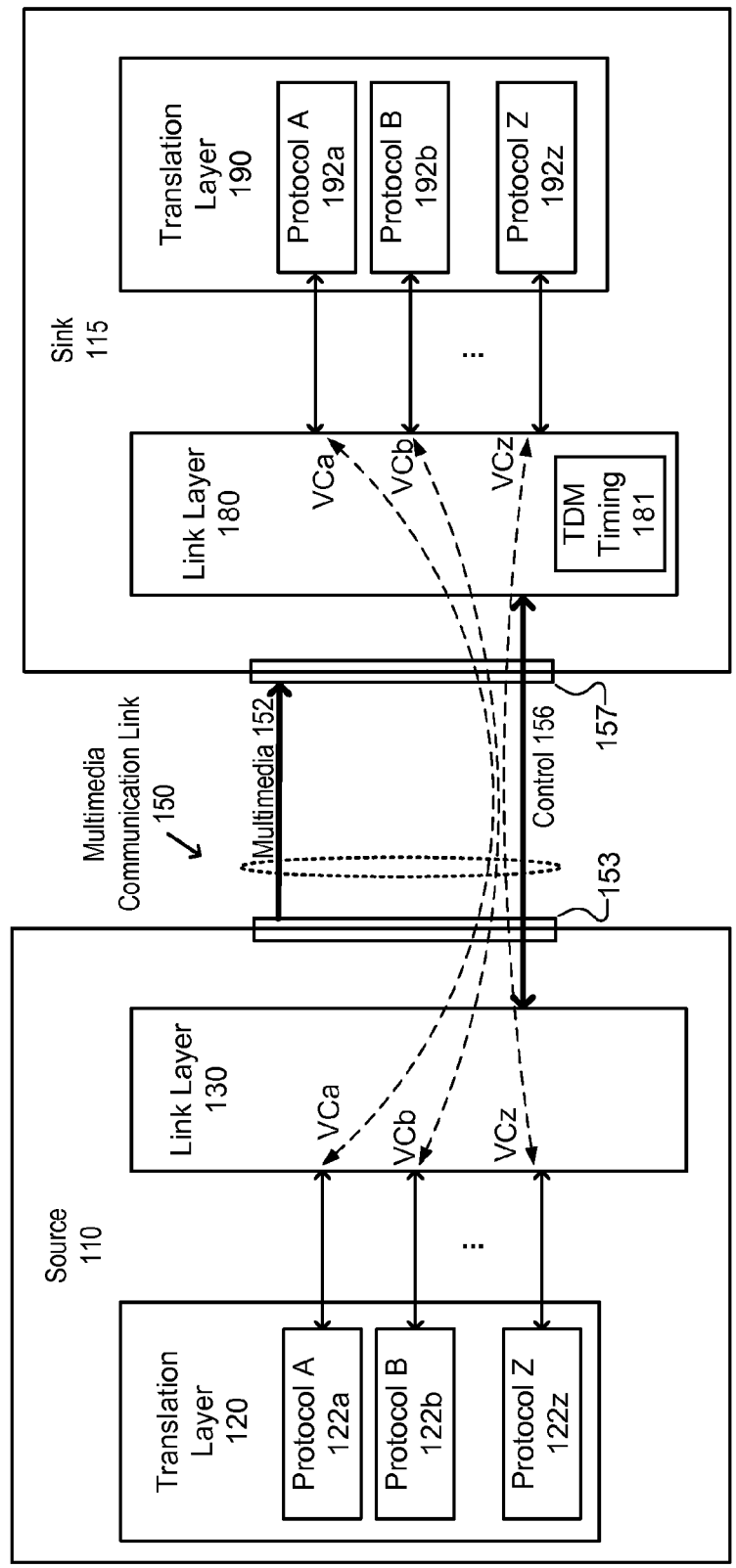
FIG. 1 is a high-level block diagram of a multimedia system for multimedia data communication using time division multiplexing, according to one embodiment.

FIG. 1 is a high-level block diagram of a multimedia system 100 for multimedia data communications, according to one embodiment. The multimedia system 100 includes a source device 110 communicating with a sink device 115 through a multimedia communication link 150. Source devices 110 are sources of video data streams. Examples of source device 110 can be mobile phones, digital video disc (DVD) players, blu-ray players, cable boxes, internet protocol television (IPTV) boxes, laptops, or integrated circuits (IC) within such devices. Sink devices 115 receive video data streams, and may include functionality to display the video data streams. Examples of sink devices 115 include liquid crystal display (LCD) televisions, LCD monitors, or ICs within such devices.

The multimedia communication link 150 includes a physical multimedia channel 152 and a physical control channel 156. Source device 110 is coupled to the multimedia channel 152 and control channel 156 through interface 153. Sink device 115 is coupled to the multimedia channel 152 and the control channel 156 through interface 157. Interfaces 153, 157 are physical elements through which communications can occur. Examples of interfaces 153, 157 are connectors, pins, driving circuits, or receiving circuits, among others.

The source device 110 transmits multimedia (e.g., video/audio/auxiliary) data streams to the sink device 115 across the multimedia channel 152. The multimedia channel 152 is one-directional and carries multimedia data streams from the source device 110 to the sink device 115. The multimedia channel 152 may be implemented using a differential pair of wires. In other embodiments there may be multiple multimedia channels 152 for transferring one or more video data streams. The video data stream can be displayed at the sink device 115 or passed on to another device for display.

The source device 110 and sink device 115 also exchange control data across the control channel 156. The control channel 156 is bi-directional and full duplex such that the source device 110 and sink device 115 can transfer control data with each other at the same time. Control data can include control commands, remote control data, copy protection information, extended display identification data (EDID), tunneled data, etc. The control channel 156 may be implemented using a differential pair of wires or a single pair of wires.

In one embodiment, the multimedia communication link 150 is a mobile high definition link (MHL) and the control channel 156 is an enhanced control bus (eCBUS) for MHL. However, embodiments of the present disclosure are not restricted to MHL and can include embodiments where the multimedia communication link 150 is a high definition multimedia interface (HDMI) link or other type of multimedia communication link.

The source device 110 includes a source translation layer 120 and a source link layer 130. The translation layer 130 includes circuitry that supports several different source communication protocols 122a-122z. Each protocol 122 specifies a different set of rules for communication of a different type of control data. Examples of protocols 122 include protocols for MHL sideband channel (MSC) and display data channel (DDC), among others. The protocols 122 operate in half-duplex, meaning that they can be either in a transmit state or a receive state at any given time, but cannot support both data transmission and data reception at the same time.

The link layer 130 receives control data from the protocols 122, packetizes the control data, and uses time division multiplexing (TDM) to map the packets onto the control channel 156. The link layer 130 treats each protocol 122 as a different virtual channel VCa-VCz. Each virtual channel is allocated to one or more time slot positions within a TDM frame for transmission across the control channel 156 through interface 153. The link layer 130 also receives TDM frames from the control channel 156. The link layer 130 decodes the TDM frames to extract control data. The control data is then forwarded on to the appropriate protocol 122. The link layer 130 communicates in full-duplex with the sink device 115 over the control channel 156 to both transmit and receive control data at the same time.

The sink device 115 includes a sink link layer 180 and a sink translation layer 190. The sink translation layer 190 includes several sink communication protocols 192a-192z that communicate with the source communication protocols 122a-122z through virtual channels VCa-VCz. The source side of a protocol 122 and the sink side of a protocol 192 are counterparts of the same overall communication protocol. For example, Protocol A includes both the source side Protocol A 122a and the sink side Protocol A 192a, both of which communicate with each other according a set of pre-defined protocol rules.

The sink link layer 180 and sink translation layer 190 are similar in function to their counterparts in the source device 110. Thus, the description of the source translation layer 120 and source link layer 130 herein generally apply to the sink link layer 180 and sink translation layer 190 as well.

There may be also differences between the source link layer 130 and sink link layer 180. One difference is that the sink link layer 180 includes a TDM timing control block 181. TDM timing control block 181 ensures that TDM frames generated by link layer 130 have a half TDM frame phase offset from the TDM frames generated by link layer 180. As a result, for a given virtual channel, the time slot position(s) for the virtual channel in one direction (e.g., from source 110 to sink 115) is offset from the time slot position(s) in the other direction (e.g., from sink 115 to source 110) by substantially half a TDM frame. Offsetting is now explained in greater detail by reference to FIG. 2.

Figure 2:
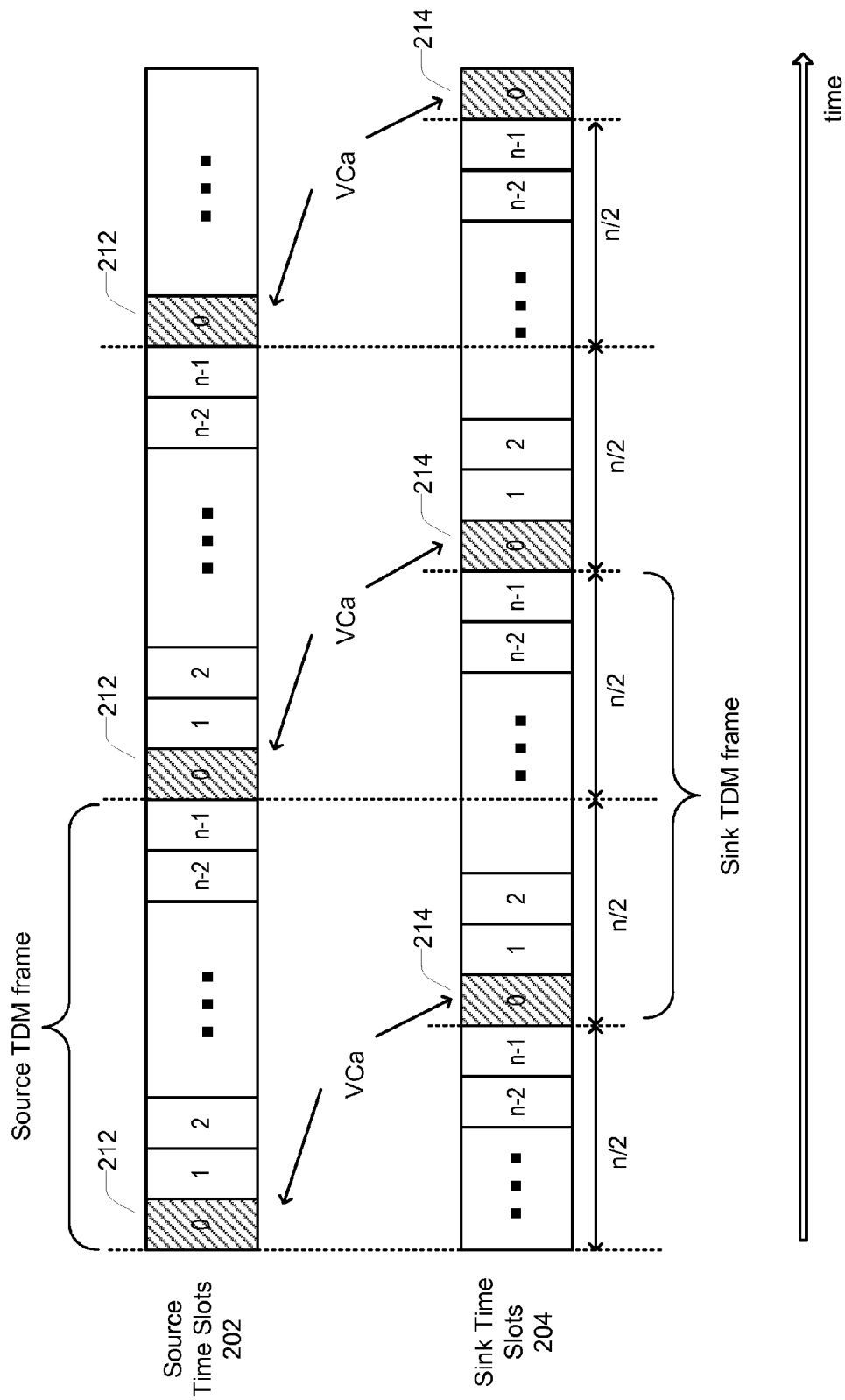
FIG. 2 is a diagram illustrating virtual channels set to offset time slots in the multimedia system of FIG. 1, according to an embodiment.

FIG. 2 is a diagram illustrating virtual channels set to offset time slot positions in the multimedia system 100 of FIG. 1, according to an embodiment. The link layers 130 and 180 divide the bandwidth of the control channel 156 into repeating time slots using TDM. Communications across the control channel 156 can be logically divided into source time slots 202 and sink time slots 204. Source time slots 202 represent time slots for transmission of control data from the source link layer 130 to the sink link layer 180 across the control channel 156. Sink time slots 204 represent time slots for transmission of control data from the sink link layer 180 to the source link layer 130 across the control channel 156. The control channel 156 is full duplex so the source time slots 202 and sink time slots 204 are used to transfer data across the control channel 156 simultaneously in both directions. The time slots are also organized into TDM frames, where each TDM frame includes n time slot positions, from slot position 0 to slot position n−1.

The source link layer 130 allocates slot positions within the source TDM frames to virtual channels, where each virtual channel represents a different source communication protocol 122. The sink link layer 180 also allocates slot positions within the sink TDM frames to the virtual channels for communications in the reverse direction. For example, virtual channel VCa may be allocated to slot position 0 in both the source time slots 202 and sink time slots 214. Virtual channel VCb (not shown) may be allocated to slot positions 1 and 2 in both the source time slots 212 and sink time slots 214.

The timing of the source TDM frames is offset from the timing of the sink TDM frames by n/2 time slots. For a given virtual channel, this causes the source slot positions allocated to the virtual channel to be offset from the sink slot positions allocated to the same virtual channel. As shown in FIG. 2, virtual channel a (VCa) is allocated to source slot position 0 212. VCa represents communication protocol A. VCa is also allocated to sink slot position 0 214. The timing of source slot position 0 212 is offset from the timing of sink slot position 0 214 by n/2 time slots. This means that sink slot position 0 214 is placed halfway between adjacent source slot position 0's 212.

Offsetting source TDM frames and sink TDM frames decreases the overall complexity of the link layer 130 when the translation layer protocols 122 are half duplex. Half duplex translation layer protocols 122 can only be in a transmit or receive state at any given time. However, the source side of a protocol 122a and the sink side of the same protocol 192a may sometimes attempt to enter the transmit state and send control data at the same time. If the source slot position and sink slot position allocated to the protocol are too close together in time, the link layers 130 and 180 will exchange conflicting or irrelevant control data, and the link layers 130 and 180 will need logic to handle these conflicts or manage the flow of data. This additional logic increases complexity and reduces bandwidth efficiency. However, by staggering the communications by n/2 time slots, both link layers 130 and 180 have sufficient time to process incoming control data and to suppress outgoing control data that could cause conflicts or be irrelevant.

In one embodiment, source slot position 0 212 may be offset from sink slot position 0 214 by substantially n/2 time slots as opposed to exactly n/2 time slots. The margin of error may be +/−10% of the total time slot positions in a TDM frame and still achieve the goal of preventing conflicts. For example, if there are 25 total time slot positions in a TDM frame, source slot position 0 212 may be offset from sink slot position 1 214 by 10-15 time slots. As another example, if there are 200 total time slot positions in a TDM frame, source slot position 0 212 may be offset from sink slot position 1 214 by 80-120 time slots.

Figure 3:
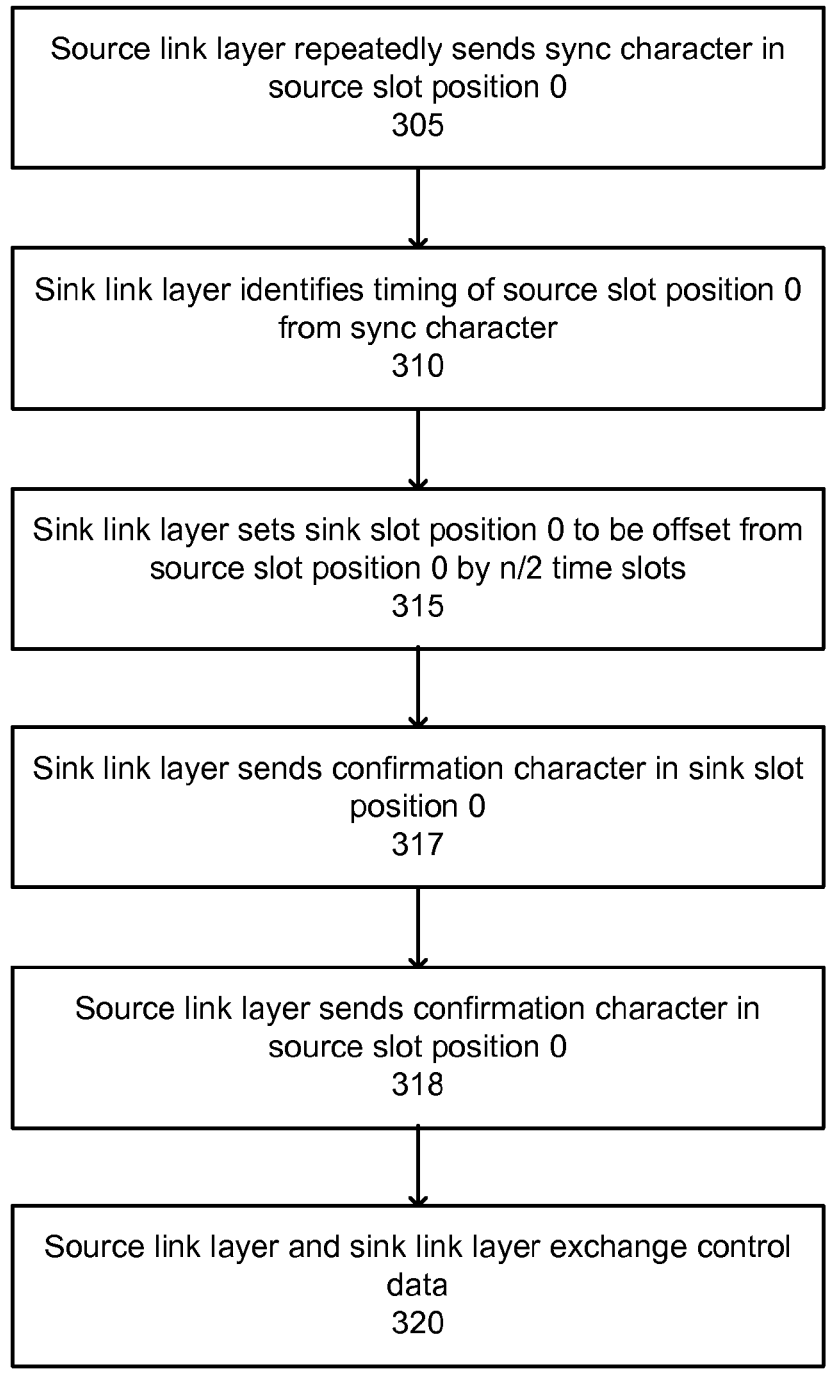
FIG. 3 is a flowchart of a method for setting offset time slots for a virtual channel in the multimedia system of FIG. 1, according to an embodiment.

FIG. 3 is a flowchart of a method for setting offset time slot positions for a virtual channel in the multimedia system 100 of FIG. 1, according to an embodiment. Data communications over the control channel 156 typically involve a synchronization phase to set the timing of the time slot positions, followed by a normal operational phase in which control data can be transferred during the time slot positions. During synchronization the source link layer 130 acts as the leader, and the sink link layer 180 acts as a follower that sets the timing of sink time slot positions by reference to the timing of the source time slot positions.

In step 305, the source link layer 305 sends a synchronization character in source slot position 0 212 allocated to virtual channel a. The synchronization character is a predetermined communication code that is used for synchronization purposes. The synchronization character is repeatedly sent in the same source slot position 0 212 over multiple source TDM frames. The sink link layer 180 receives the synchronization character in the source slot position 0 212.

In step 310, the sink link layer 180 identifies the synchronization character in the source time slots 202, and identifies the timing of source position slot 0 212 allocated to virtual channel a from the synchronization character. In one embodiment, the sink link layer 180 has an internal slot counter and forces the internal slot counter to n/2 when the synchronization character is detected.

In step 315, the sink link layer 180 sets the timing of sink slot position 0 by offsetting sink slot position 0 relative to source slot position 0. The amount of the offset is a predetermined offset of n/2 time slots. The result is that sink TDM frames are offset from the source TDM frames by n/2 time slots. In one embodiment, the previously mentioned internal slot counter increments from n/2 to n−1, at which point it resets to zero. When the count returns to zero, this phase offset is captured and used as the timing for sink slot position 0 214.

In step 317, the sink link layer 180 then sends a confirmation character in sink slot position 0 to indicate that synchronization is successful. Steps 310 through 317 can be performed by the TDM timing block 181. In step 318, the source link layer 180 then changes its synchronization character to a confirmation character in source slot position 0. This completes synchronization.

In step 320, the source link layer 130 and sink link layer 180 are now synchronized and begin exchanging control data across the control channel 156 during the slot positions 212 and 214 that are offset from each other in time. The offset slot positions prevent conflicting control data for a protocol from being exchanged between the link layers 130 and 180, as previously explained.

Referring back to FIG. 1, some of the source communication protocols 122 may be older protocols having strict timing requirements for communications. One particular requirement is that once a protocol 122 initiates a communication transaction, the protocol 122 expects the transaction to be completed within a fixed amount of time (e.g. in 16 us). The link layers 130 and 180 are designed to help meet this requirement so that the protocols 122 do not need to be re-designed for use with a full duplex control channel 156, as will be explained in FIG. 4.

Figure 4:
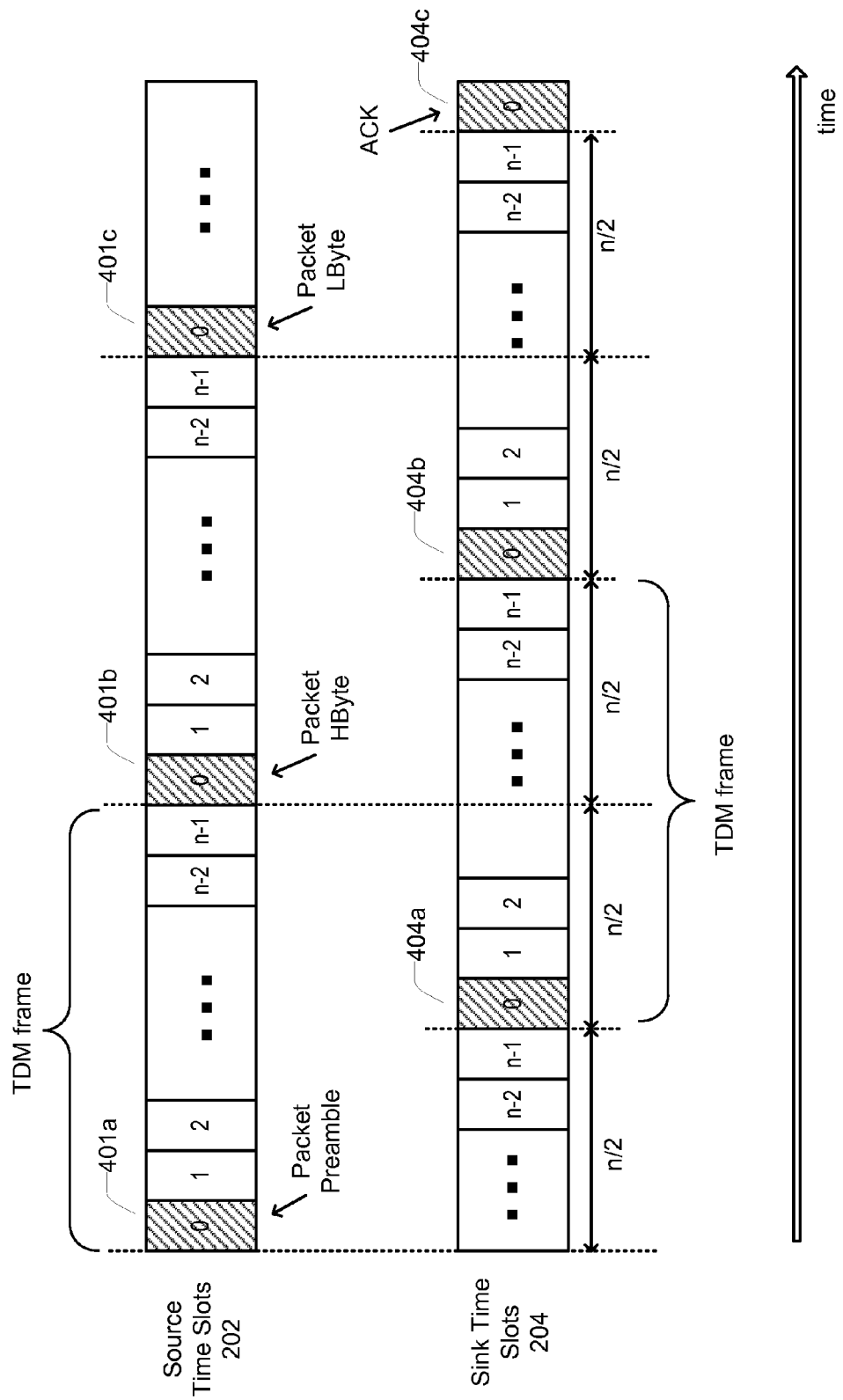
FIG. 4 is a diagram illustrating acknowledgement timing, according to an embodiment.

FIG. 4 is a diagram illustrating acknowledgement timing in the multimedia system 100 of FIG. 1, according to an embodiment. FIG. 4 is similar to FIG. 2, but now includes specific information sent during source time slots 401a-c and sink time slot 404c. Source protocol A 122a starts a communication by sending (not shown) 11 bits of control data to the source link layer 130. The source link layer 130 packetizes the control data into a 24 bit control data packet and sends the control packet during a source slot position 401 allocated to virtual channel 0 over three consecutive TDM frames. The control data packet is sent as three separate bytes: a packet preamble is sent during time slot 401a, a high byte is sent during time slot 401b, and a low byte is sent during time slot 401c. Once the entire packet is received by the sink link layer 180, the sink link layer 180 responds with an acknowledgement ACK or NACK in the next immediate sink time slot 404c allocated to virtual channel 0. The acknowledgement may then be forwarded (not shown) on to the source protocol A 122a to complete the communication transaction.

Immediately acknowledging the control data packet in less than one TDM frame decreases the amount of time required to complete a communication transaction so that the requirements of the protocols 122 can be met. Additionally, sink slot position 401 is offset from source slot position 404 by n/2 time slots. The worst case time for completing a communication transaction is ~3.5 TDM frames, which includes ~1 TDM frame wait time for translation layer data that arrives early before its allocated time slot, ~2 TDM frames to transfer the control data packet in time slots 401 (i.e., 401a-401c), and ~0.5 TDM frames for the acknowledgement in time slot 404c. This worst case time is the same regardless of whether the communication transaction is started by the source translation layer 120 or sink translation layer 190, which ensures that communication transactions have substantially symmetric worst case times.

Retry Disparity

Figure 5:
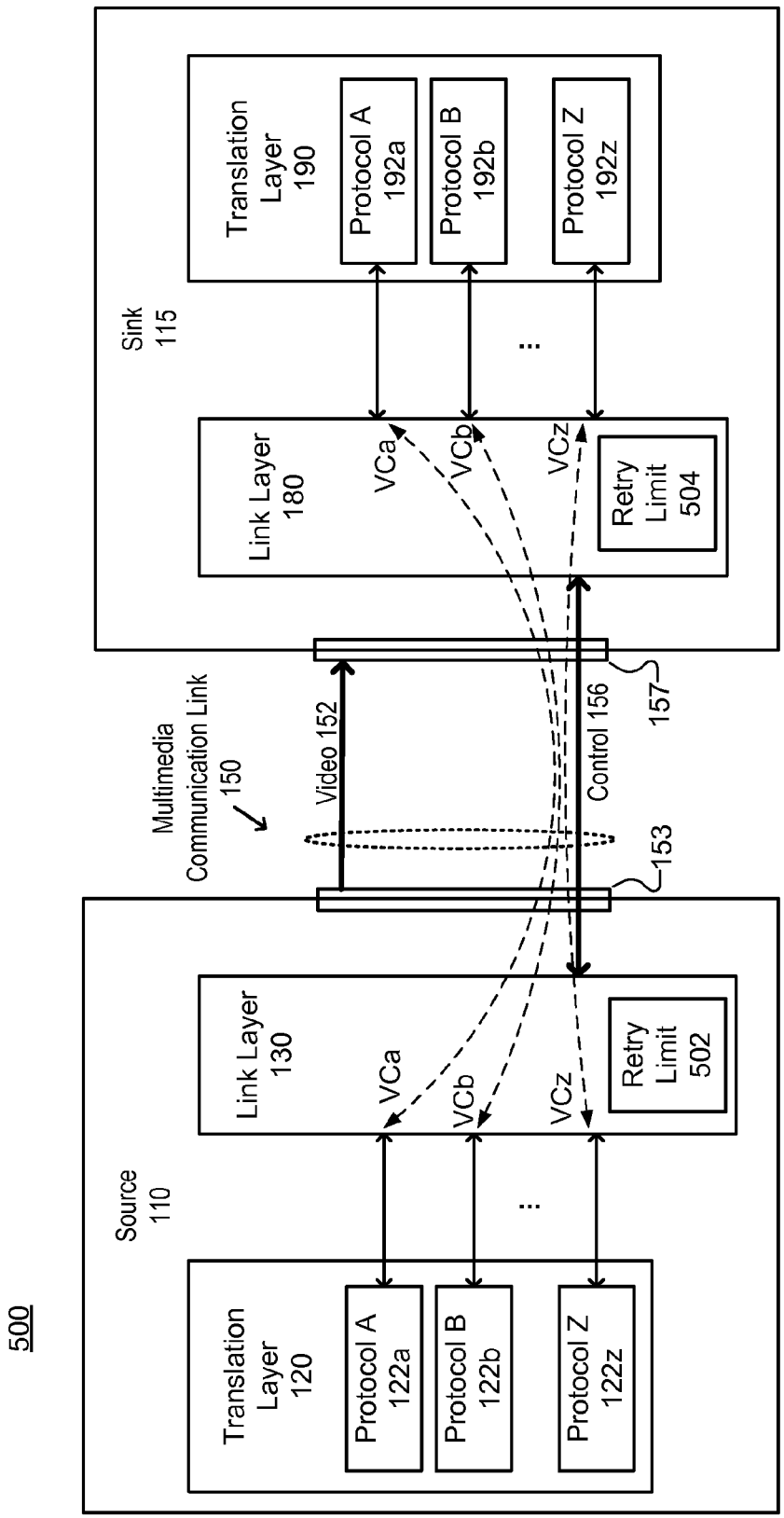
FIG. 5 is a high-level block diagram of a multimedia system for multimedia data communication with retry disparity, according to another embodiment.

FIG. 5 is a high-level block diagram of a multimedia system 500 for multimedia data communication with retry disparity, according to another embodiment. The multimedia system 500 of FIG. 5 is similar to the multimedia system 100 of FIG. 1, but now the source link layer 130 includes a maximum source retry limit 502, and the sink link layer 180 includes a maximum sink retry limit 115. The maximum source retry limit 502 limits the number of times the source link layer 130 will attempt to retry an unsuccessful communication over the control channel 156. The maximum sink retry limit 504 limits the number of times the sink link layer 180 will attempt to retry an unsuccessful communication over the control channel 156.

The maximum sink retry limit 502 and maximum source retry limit 504 have different values, which prevents deadlocks. Maximum sink retry limit 502 may be greater than or less than maximum source retry limit 504. In one embodiment, the maximum source retry limit 502 may be 4*X+3, where X is an integer. The maximum sink retry limit 504 may be 4*Y+1, wherein Y is an integer. X and Y may be the same or different values. For example, if X and Y are both 1, the maximum source retry limit 502 is 7, and the maximum sink retry limit 504 is 5. X and Y may be selected at random, be hardcoded, or negotiated by the source device 110 and sink device 115.

Figure 6:
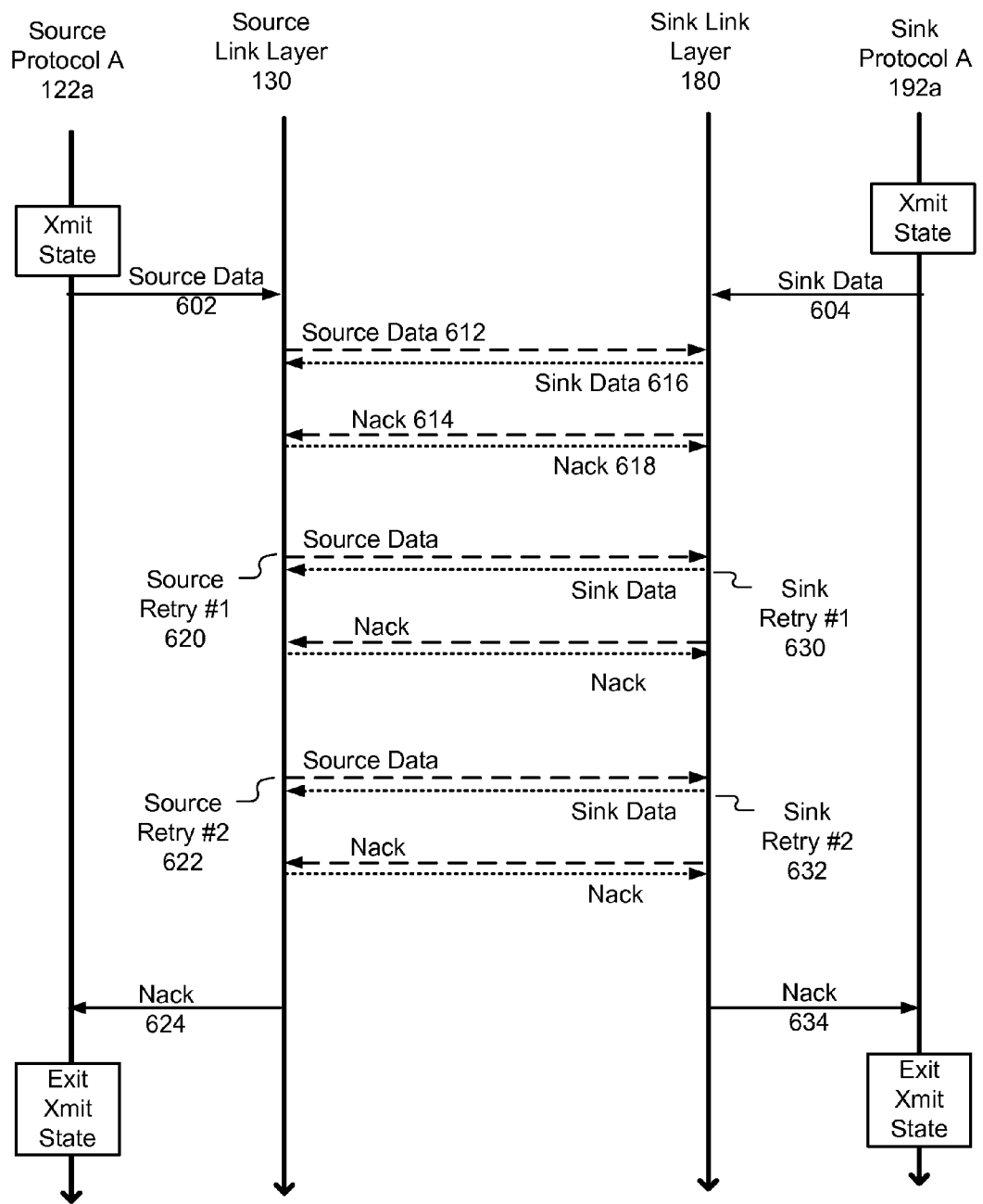
FIG. 6 is a diagram illustrating the problem faced by the multimedia system of FIG. 5, according to an embodiment.

FIG. 6 is a diagram illustrating the problem faced by the multimedia system 500 of FIG. 5, according to an embodiment. FIG. 6 shows communications between source protocol A 122a, source link layer 130, sink link layer 180, and sink protocol A 192a. The communications between source link layer 130 and sink layer 180 in FIG. 6 may occur through a virtual channel (e.g., VCa).

A problem with data communications can occur when two sides of a protocol attempt to enter the transmit state around the same time. As shown in FIG. 6, initially source protocol A 122a enters the transmit state and transmits source control data 602 to the source link layer 130. Around the same time, sink protocol A 192a also enters the transmit state and transmits sink control data 604 to the sink link layer 180.

The source link layer 612 transmits source data 612 to the sink layer 180 in response to receiving source data 602. Sink link layer 180 cannot pass the source data 612 onto sink protocol A 192 because sink protocol A, which is half duplex, is in the transmit state. Thus, sink link layer 180 responds with a negative acknowledgement NACK 614 to the source link layer 130 to indicate an unsuccessful communication.

Similarly, the sink link layer 180 also transmits sink data 616 to the source link layer 130 in response to receiving sink data 604. However, source link layer 130 cannot pass the sink data 616 onto source protocol A 122a because source protocol A 122a, which is half duplex, is in the transmit state. Thus, source link layer 130 responds with a NACK 618 to the sink link layer 180 to indicate an unsuccessful communication.

The source link layer 130 attempts to retry the source data communication two times (620, 622). However, each repeated retry attempt also fails. After two retries, the source link layer 130 sends a NACK 624 to the source protocol A 122a that causes the source protocol A 122a to exit the transmit state.

Similarly, the sink link layer 180 also attempts to retry the sink data communication two times (630, 632). However, each repeated retry attempt also fails. After two retries, the sink link layer 180 sends a NACK 634 to the sink protocol A 192a that causes the sink protocol A 192a to exit the transmit state.

In FIG. 6, the source link layer 130 and sink link layer 180 each retry a failed communication two times. This causes a deadlock where neither side can successfully complete a communication transaction. This deadlock problem in FIG. 6 is addressed by having different maximum retry limits for the source link layer 130 and sink link layer 180, as will be explained by reference to FIG. 7.

Figure 7:
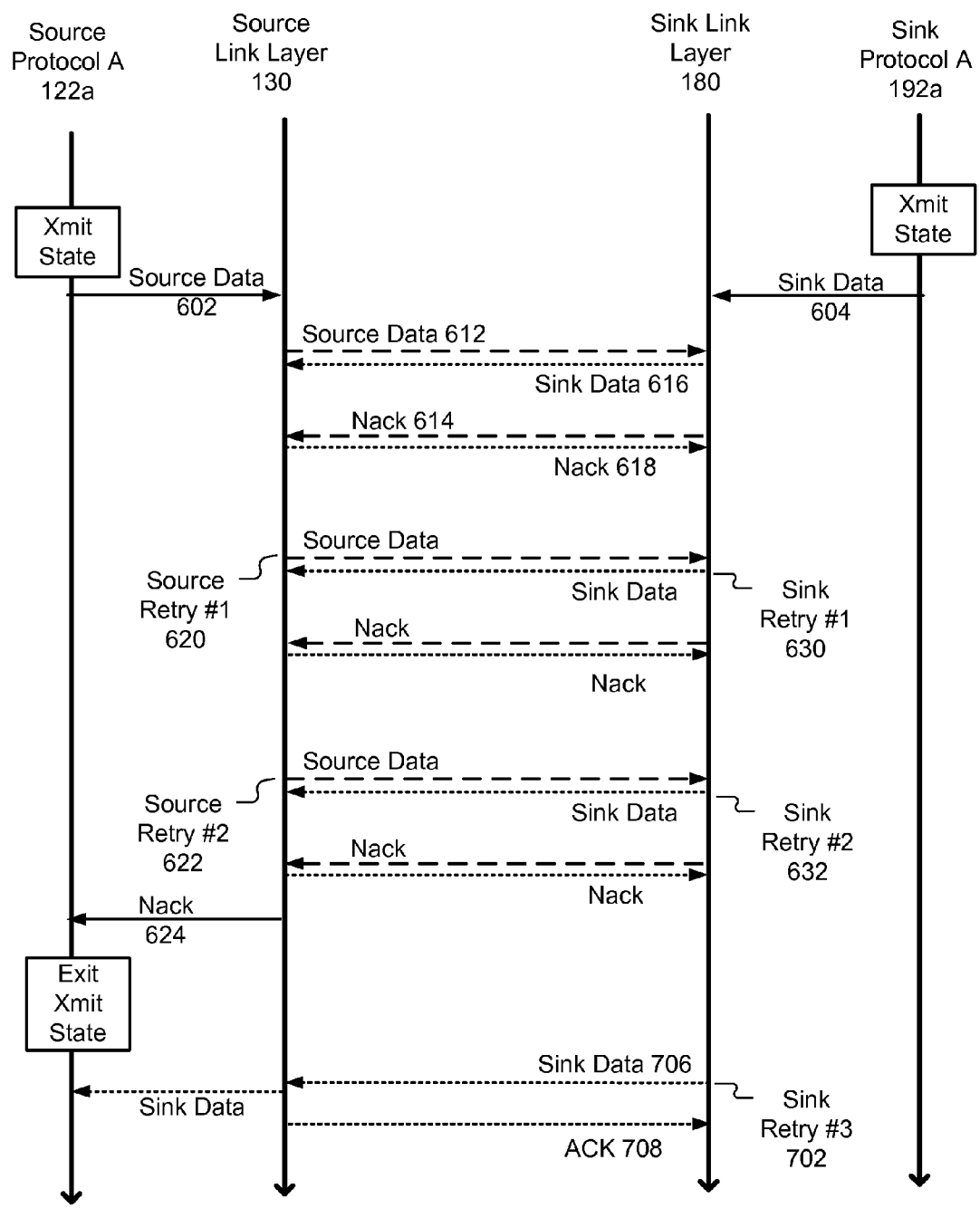
FIG. 7 is a diagram illustrating retry disparity in the multimedia system of FIG. 5, according to an embodiment.

FIG. 7 is a diagram illustrating retry disparity in the multimedia system 500 of FIG. 5, according to an embodiment. In FIG. 7, the source link layer 130 retries failed communications over the control channel 156 two times (620, 622). The sink link layer 180 retries failed communications over the control channel 156 three times (630, 632, 702). The last retry 702 by the sink link layer 180 is successful because the source protocol A 122a is no longer in the transmit state, which allows sink data to be passed onto the source protocol A 122a. The source link layer 130 then provides a positive ACK 708 to the sink link layer 180 as acknowledgement of a successful communication.

In some embodiments, the phase offsetting of multimedia system 100 and the retry disparity of multimedia system 500 may be combined into a single system. In other embodiments, a multimedia system may include either the phase offsetting of multimedia system 100 or the retry disparity of multimedia system 500, but not both.

In one embodiment, a representation of circuitry within the source device 110 or sink device 115 may be stored as data in a non-transitory computer-readable medium (e.g. hard disk drive, flash drive, optical drive). These descriptions may be behavioral level, register transfer level, logic component level, transistor level and layout geometry-level descriptions.

Upon reading this disclosure, those of skill in the art will appreciate still additional alternative designs for a multimedia system for data communications over a full duplex control channel of a multimedia communication link. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A system for data communications, the system comprising:
   a multimedia communication link having a full duplex control channel;
   a source device to communicate data over the full duplex control channel of the multimedia communication link, the source device having a first link layer that retries unsuccessful data communications over the full duplex control channel until a first maximum retry limit of the first link layer is reached; and a sink device to communicate data over the full duplex control channel of the multimedia communication link, the sink device having a second link layer that retries unsuccessful data communications over the full duplex control channel until a second maximum retry limit of the second link layer is reached, the second maximum retry limit being different than the first maximum retry limit.

2. The system of claim 1, wherein the first maximum retry limit is higher than the second maximum retry limit.

3. The system of claim 1, wherein the first maximum retry limit is lower than the second maximum retry limit.

4. The system of claim 1, wherein the first maximum retry limit is equal to 4X+3, wherein X is an integer.

5. The system of claim 4, wherein the second maximum retry limit is equal to 4Y+1, wherein Y is an integer.

6. The system of claim 1, wherein an unsuccessful data communication is indicated by a receipt of a negative acknowledgement via the full duplex control channel.

7. The system of claim 1, wherein the data communicated by the source device corresponds to data from a half-duplex translation layer protocol.

8. A first device for data communications with a second device via a multimedia communication link, the first device comprising:
an interface to a full duplex control channel of the multimedia communication link; and
a link layer to communicate data with the second device over the full duplex control channel, the link layer to retry unsuccessful data communications over the full duplex control channel until a first maximum retry limit is reached, the first maximum retry limit being different than a second maximum retry limit of a link layer of the second device.

9. The first device of claim 8, wherein the first maximum retry limit is higher than the second maximum retry limit.

10. The first device of claim 8, wherein the first maximum retry limit is lower than the second maximum retry limit.

11. The first device of claim 8, wherein the first maximum retry limit is equal to 4X+3, wherein X is an integer.

12. The first device of claim 11, wherein the second maximum retry limit is equal to 4Y+1, wherein Y is an integer.

13. The first device of claim 8, wherein an unsuccessful communication is indicated by a receipt of a negative acknowledgement via the full duplex control channel.

14. The first device of claim 8, wherein the data communicated by the first device corresponds to data from a half-duplex translation layer protocol.

15. A non-transitory computer readable medium storing a representation of a first device for data communications with a second device via a multimedia communication link, the first device comprising:
an interface to a full duplex control channel of the multimedia communication link; and
a link layer to communicate data with the second device over the full duplex control channel, the link layer to retry unsuccessful data communications over the full duplex control channel until a first maximum retry limit is reached, the first maximum retry limit being different than a second maximum retry limit of a link layer of the second device.

16. The non-transitory computer readable medium of claim 15, wherein the first maximum retry limit is higher than the second maximum retry limit.

17. The non-transitory computer readable medium of claim 15, wherein the first maximum retry limit is lower than the second maximum retry limit.

18. The non-transitory computer readable medium of claim 15, wherein the first maximum retry limit is equal to 4X+3, wherein X is an integer.

19. The non-transitory computer readable medium of claim 18, wherein the second maximum retry limit is equal to 4Y+1, wherein Y is an integer.

20. The non-transitory computer readable medium of claim 15, wherein an unsuccessful communication is indicated by a receipt of a negative acknowledgement via the full duplex control channel.

* * * * *